(12) United States Patent
Vadlja et al.

(10) Patent No.: US 6,810,848 B2
(45) Date of Patent: Nov. 2, 2004

(54) AIR INTAKE CHANNEL SYSTEM FOR INTERNAL COMBUSTION ENGINES

(75) Inventors: Tomislav Vadlja, Viersen (DE); Armin Huck, Aachen (DE); Hans-Ulrich Kuehnel, Moenchengladbach (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 10/410,638

(22) Filed: Apr. 9, 2003

(65) Prior Publication Data

US 2003/0192500 A1 Oct. 16, 2003

(30) Foreign Application Priority Data

Apr. 10, 2002 (DE) .......................................... 102 15 604

(51) Int. Cl.⁷ ............................................. F02M 35/10
(52) U.S. Cl. .................................................. 123/184.55
(58) Field of Search ....................... 123/184.55, 184.53

(56) References Cited

U.S. PATENT DOCUMENTS 6,408,810 B1 * 6/2002 Leipelt et al. .......... 123/184.55
6,435,152 B1 * 8/2002 Leipelt et al. .......... 123/184.55

FOREIGN PATENT DOCUMENTS

DE            197 56 332          6/1999

* cited by examiner

Primary Examiner—Tony M. Argenbright
Assistant Examiner—Katrina B Harris
(74) Attorney, Agent, or Firm—Ohlandt, Greeley, Ruggiero & Perle, L.L.P.

(57) ABSTRACT

An air intake channel system for internal combustion engines is provided. The system includes several air intake channels each of which is formed by at least a first and a second channel member. A common channel member is allocated to two of the air intake channels and includes two air inlet openings. By pivoting the common channel member, the length of the air intake channels can be jointly varied.

16 Claims, 3 Drawing Sheets

AIR INTAKE CHANNEL SYSTEM FOR INTERNAL COMBUSTION ENGINES

BACKGROUND OF THE INVENTION

The invention relates to an air intake channel system for internal combustion engines, particularly for V engines.

From DE 197 56 332, an air intake channel system is known where the length of several air intake channels each of which is connectable to a cylinder of an internal combustion engine is adapted to be continuously varied. To this end, the spirally configured intake channels are arranged next to each other. Each spiral air intake channel comprises an air inlet opening connected to a central inner region of the air intake system. Through said air inlet opening, air enters into the spiral channel and is led to the respective cylinder after it has flown through the spiral channel. Within the central region, a tubular channel member is arranged which forms the inner wall of the spiral channel and comprises the air inlet opening. The tubular channel member is pivotably arranged so that the position of the air entrance opening can be varied. By pivoting the tubular channel member, the length of the air intake channel, i.e., the distance between the air entrance opening and the air exit opening to be flown through by the air, can thus be continuously varied.

The individual channel members forming the intake channels are arranged adjacent to each other or stacked upon each other, the configured air intake channels being alternately connected with the one or the other row of the cylinders of the V engine. For pivoting the inner pivotable channel members, they are connected to a pivot axis. Thus, each air intake channel is formed substantially by a stationary channel member and a pivotable channel member. The tubular pivotable channel member is supported in a recess of the stationary channel member. Since the cross-section of the individual air intake channels has to be relatively large to provide a sufficient amount of air, such air intake channel systems with variable lengths of the air intake channels are built very large, particularly in six or eight cylinder engines.

SUMMARY OF THE INVENTION

It is the object of the invention to provide an air intake channel system with a variable length of the air intake channels the required building space of which is reduced.

In the air intake channel system according to the invention, two adjacent air intake channels, respectively, are combined. Thereby, the building space of the air intake channel system can be halved approximately. To be able to combine two adjacent air intake channels, according to the invention, a common pivotable channel member is provided for these two air intake channels. According to the invention, the channel member has two air inlet openings that are connected to one of the two air intake channels, respectively. In case of an air intake channel system assembled, in principle, in the same manner as in DE 197 56 332, with several pivotable inner channel members arranged adjacent to each other and surrounded by outer channel members so that annular air intake channels are created, it has been noted that the variability of the length of the intake channel does not have to be as great as with such air intake channel systems. Therefore, it is possible to arrange two adjacent air intake channels preferably in one plane. For an air intake channel system having, in principle, the same structure as previously described, this means that the channel that is annular in this manner is substantially halved so that, per intake channel, half of a ring can be substantially used as variable length of the intake channel.

Preferably, the two intake channels partly surround the inner pivotable channel member, respectively.

In an eight cylinder engine, for example, four air intake channel units assembled according to the invention are provided. They are preferably actuated via a single common shaft for pivoting the pivotable channel members. Thus, it is possible by providing, according to the invention, air intake channel units with respectively two air intake channels to provide only one drive shaft. This considerably simplifies the construction of the air intake channel system in comparison with prior art where two drive shafts have to be provided. Particularly, the manufacturing costs are reduced thereby as well, since both less components are required and the assembly of the individual components can be formed simpler. Since less components are required, a smaller addition of tolerances takes place so that a smaller overall tolerance can be achieved. By pivoting the common drive shaft, the intake length of the air intake channels is simultaneously changed for all the cylinders. Pivoting the common pivotable channel member particularly effects the simultaneous variation of the intake length of the air intake channel of the two air intake channels forming the air intake channel unit.

Further, the provision of a single common drive shaft has the advantage that drive wheels and the like for connecting two drive shafts are not required.

BRIEF DESCRIPTION OF THE FIGURES

Hereinafter, the invention is explained in detail with respect to a preferred embodiment thereof with reference to the accompanying drawings, in which.

DETAILED DESCRIPTION OF A PREFERRED EMBODIMENT

Figure 1:
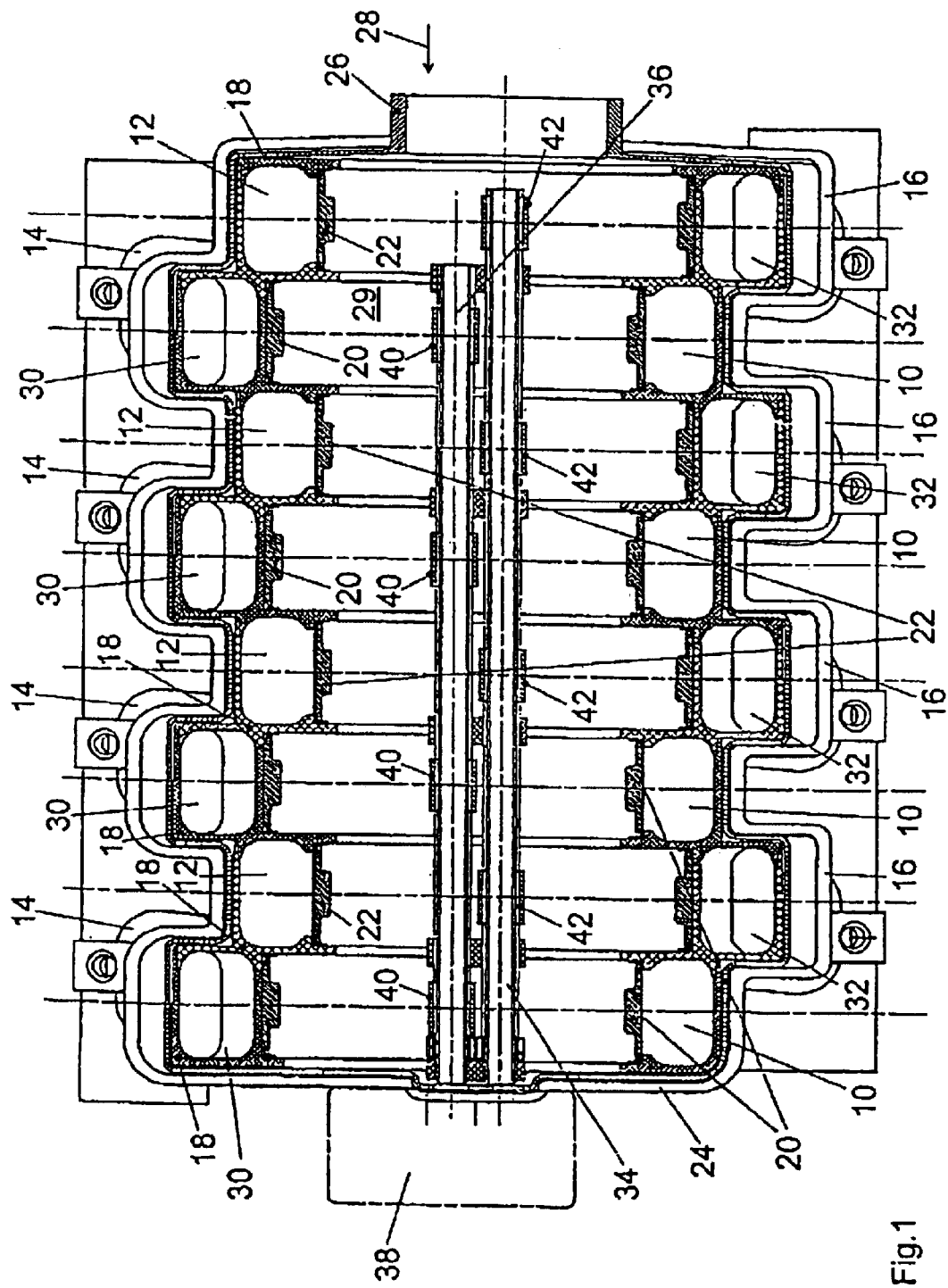
FIG. 1 shows a schematic sectional view of an air intake channel system for an eight cylinder V engine according to prior art.

The air intake channel system according to prior art illustrated in FIG. 1 comprises eight spirally extending air intake channels 10,12. The intake channels 10 are connected to one side of the V engine via lugs 14 and the intake channels 12 are connected to the other side of the V engine via lugs 16. Each of the individual intake channels is formed by a first channel member 18 that is stationary in the illustrated embodiment and a second channel member 20,22 that is adapted to be pivoted. Except for the two channel members provided at the left and right border in the Figure, all the first channel members 18 have an identical structure and are arranged next to each other or stacked upon each other, as illustrated in FIG. 1. The first channel members 18 are arranged in a housing 24 comprising two housing halves. The pivotable second channel members 20 and 22 are identically formed as well.

The air to be supplied to the individual intake channels 10,12 is led via an air intake fitting 26 in the direction of an arrow 28 into the common inner region 29 of the air intake system. The inner region 29 is formed by the pivotable channel members 20,22 arranged next to each other each of which has a substantially circular cylindrical configuration. Depending on the design, additional intake openings are connected to the individual air intake channels 10,12, if necessary, so that air enters into the air intake channels 10,12 through the central region of the air intake channel system as well as through the additional supply channels. From the central region of the air intake channel system, the air enters through the air inlet openings provided in the pivotable channel members 20,22 into the corresponding air intake channels 10,12. Therefrom, the air exits through air outlet openings 30 and 32, respectively, and is guided to the corresponding cylinders through non-illustrated channels.

For varying the length of the air intake channels 10,12, the pivotable channel members 20,22 are firmly connected with pivot axes 34,36. By pivoting the pivot axes 34,36 by means of an actuator 38, the air inlet openings of the pivotable channel members 20,22 are changed in their positions so that the air from the central region 29 enters into the spiral air intake channels 10,12 at another position and thus has to cover a shorter or longer distance.

Via webs, the second channel members 20 are connected with holding devices 40 and form an adjusting element. Via a tube profile (square), the holding devices 40 are connected with the pivot axis 36. The connection between the holding devices 40 and the pivot axis 36 is effected additionally via leaf springs. Correspondingly, the channel members 22 are connected with the pivot axis 34 via webs and holding devices 42. Thus, the channel members 20 and 22, respectively, are always pivoted in common, so that the air intake channels 10 and 12, respectively, have the same length per side of the V engine. The pivotable channel member 20 is arranged between two neighboring fixed channel members 18.

Figure 2:
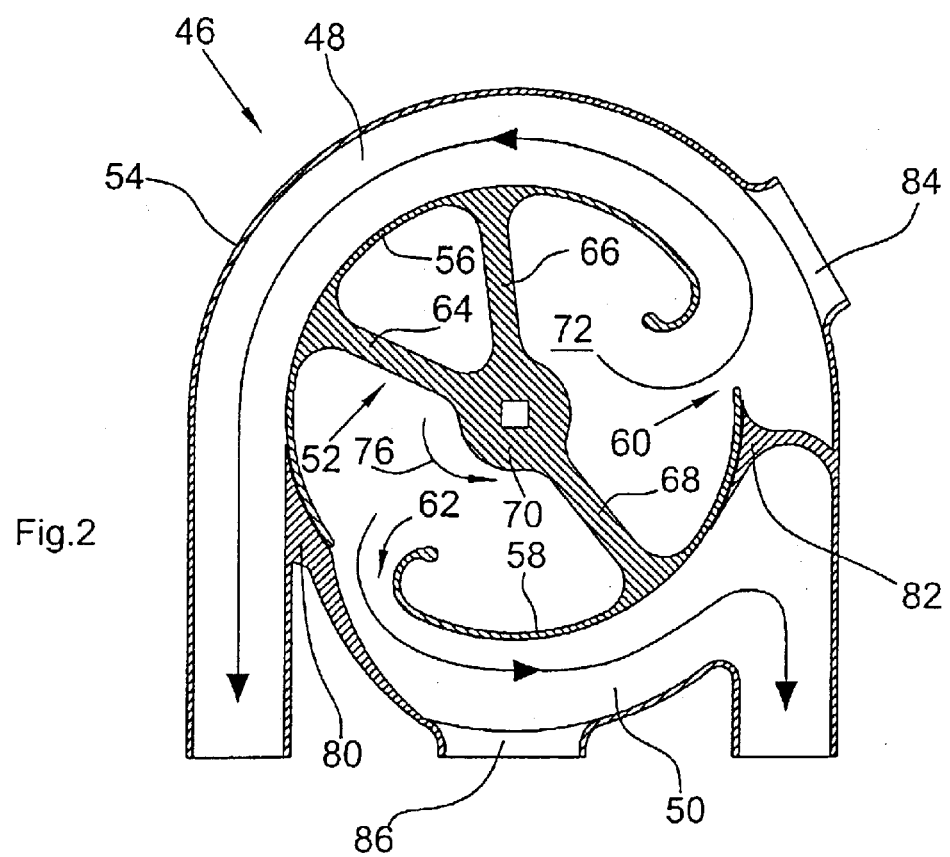
FIG. 2 shows a schematic sectional view of an air intake channel unit according to the invention in a first position.
Figure 3:
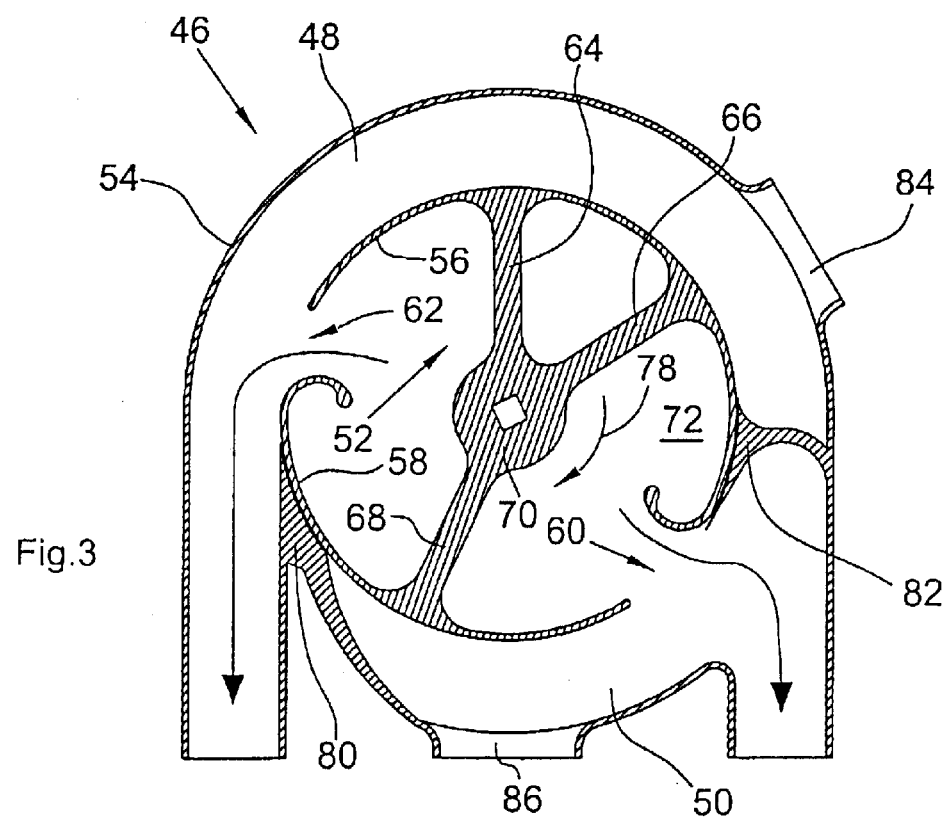
FIG. 3 shows a schematic sectional view of an air intake channel unit according to the invention in a second position.
Figure 4:
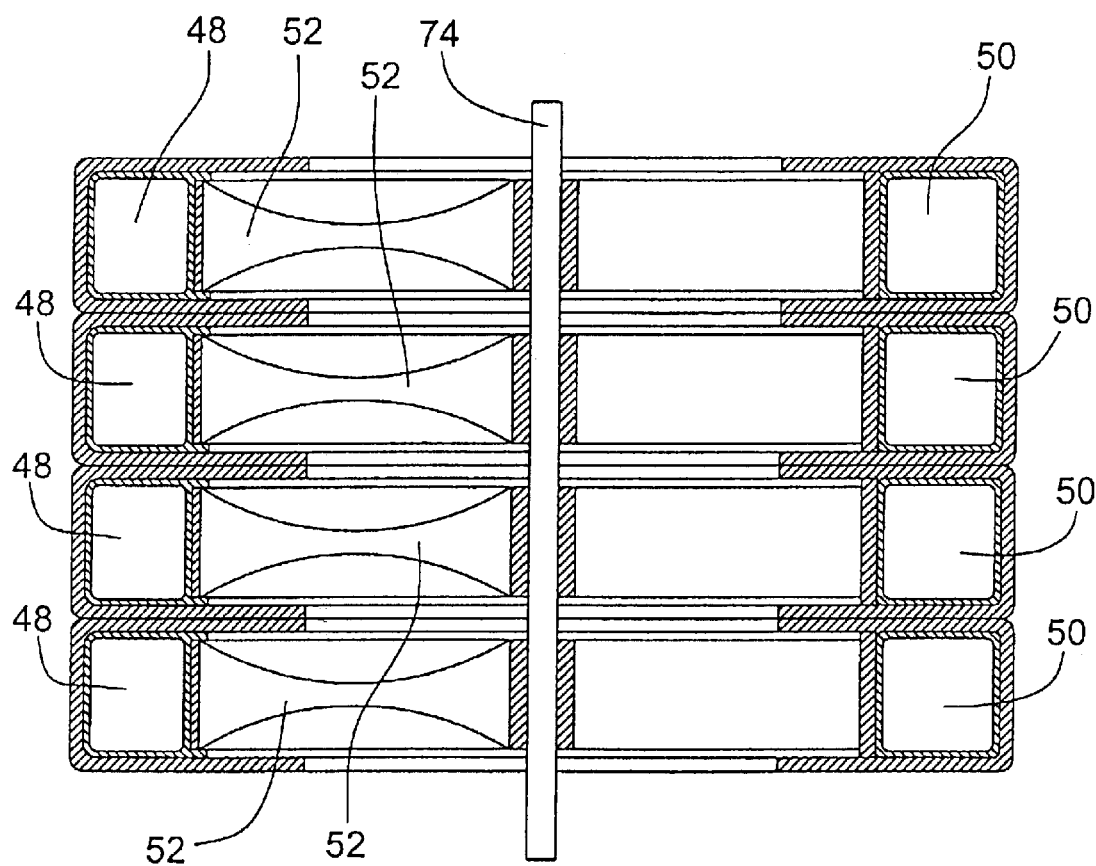
FIG. 4 shows a schematic longitudinal section through an air intake channel system according to the invention.

With reference to the state of the art illustrated in FIG. 1, in the air intake channel system according to the invention, two neighboring air intake channels respectively leading to one side of the V engine are combined to form an air intake channel unit where the two air intake channels are arranged in one plane. Such an air intake channel unit according to the invention is illustrated in FIGS. 2–4. The air intake channel unit 46 comprises two air intake channels 48,50, respectively. The two air intake channels 48,50 formed by a common pivotable channel member 52 as well as a channel member 54 surrounding the latter are partially configured in the shape of a partial ring. To this end, the internal common channel member 52 is substantially annular, two channel walls 56,58 respectively forming channel walls of the air intake channel 48 and 50, respectively, being arranged on a circle. The common channel member 52 comprises two air entrance opening 60,62. The two air entrance openings 60,62 are arranged opposite to each other and respectively represent an interruption of the channel walls 56,58. In any case, the arrangement of the air entrance openings 60,62 is selected such that the formed air intake channels 48,50 have the same length. This may result in that the two air entrance openings 60,62 are not exactly opposite to each other but are slightly offset with respect to each other.

Further, the common pivotable channel member 52 comprises webs 64,66,68 by which the two channel walls 56,58 are connected with each other. Preferably, the three webs 64,66,68 are connected with each other via a common receiving portion 70. The three webs 64,66,68 are preferably arranged in the shape of a Y or a star. The webs 64,66,68 serving to stabilize the channel member 52 are preferably configured such that the inner region 72 through which the air is taken in is not divided into individual segments. Thus, all the air intake channels 48,50 are connected with a common internal region 72.

Preferably, the receiving portion 70 is arranged in the center of the substantially circular channel member 52 so that a common central drive shaft 74 (FIG. 4) with a square cross-section, for example, may be provided by which all the channel members 52 are pivoted in common.

The length of the intake channels 48,50 of which one, respectively, is connected with a cylinder of the one side of the V engine and the other with a cylinder of the other side of the V engine can be changed by rotating the channel member 52 in the direction of the arrow 76 (FIG. 2) and by rotating in the direction of the arrow 78 (FIG. 3), respectively. To this end, the length of the channel 48,50 is at its maximum in the state illustrated in FIG. 2 and at its minimum in the state illustrated in FIG. 3.

In an air intake channel system for a V 8 engine according to the invention, four air intake channel units 46 are arranged on top of each other (FIG. 4). The length of all the air intake channels 48,50 is varied by pivoting the common drive shaft 74. Therefor, only a single drive shaft 74 is required to vary the lengths of all the air intake channels 48,50. Thus, the constructional assembly of the air intake channel system according to the invention is considerably simpler.

Since the pivotable channel members 52 are adapted to be pivoted via a single common shaft, it is possible to rotate the channel members 52 by 360° or more. Stops and thus maximum adjusting angles required when providing two drive shafts (FIG. 1) are not required in the air intake channel system according to the invention. Thus, it is possible, for example, to reduce the size of the air entrance openings 60,62 by rotating the channel 52 in FIG. 2 opposite to the direction of the arrow 76, for example. In doing so, a part of the air entrance openings 60,62 is covered by a sealing member 80 and 82, respectively. The amount of air supplied to the cylinders through the air intake channels 48,50 can thus be easily varied by the air intake channel system. Thus, the air intake channel system according to the invention is adapted to be also used as a speed limiter, for example. Varying the air amount is of course also possible in the position illustrated in FIG. 3 by pivoting the channel member opposite to the direction indicated by the arrow 78.

The sealing members 80,82 serve as sealing between the two air intake channels 48,50.

Furthermore, each air intake channel 48,50 can be provided with an additional opening 84,86. By the additional openings 84,86 that are adapted to be opened or closed by flaps, for example, the air amount supplied through the air intake channels 48,50 can be further varied. Further, it is possible to influence the swirl of the air within the air intake channels 48,50 by the flap position.

What is claimed is:

1. An air intake channel system for internal combustion engines, comprising several air intake channels, respectively, formed by at least a first and a second channel member, an air entrance opening provided in one of the channel members and an air exit opening provided at the other channel member, at least one of the channel members being adapted to be pivoted about a pivot axis for varying the length of the respective air intake channel, wherein two air intake channels, respectively, comprise a common pivotable channel member with a first and a second air entrance opening that are respectively connected to one of the two air intake channels and wherein the respectively two air intake channels are substantially arranged in one plane.

2. The air intake channel system of claim 1, wherein the air intake channels partly surround the pivotable channel member.

3. The air intake channel system of claim 1, wherein the common channel member comprises two channel walls having substantially the shape of a segment of a circle.

4. The air intake channel system of claim 1, wherein the channel walls of the channel member are connected with each other via webs.

5. The air intake channel system of claim 4, wherein the webs are connected with a central receiving portion.

6. The air intake channel system of claim 5, wherein the receiving portion is adapted to be connected with a drive shaft.

7. The air intake channel system of claim 1, wherein the air entrance openings are provided so as to be substantially opposite to each other in the common channel member.

8. The air intake channel system of claim 1, wherein several air intake channel units are arranged next to each other, comprising two air intake channels each.

9. The air intake channel system of claim 8, wherein the pivotable channel members are adapted to be pivoted via a single common drive shaft.

10. The air intake channel system of claim 8, wherein the air entrance openings are connected with an inner region jointly belonging to the air intake channel units.

11. An air intake channel system, comprising:

a first air intake channel member having an air entrance opening;

a second air intake channel member having an air exit opening, said second air intake channel member being adapted to be pivoted about a pivot axis for varying a length thereof; and a common pivotable channel member in fluid communication with said first and second air intake channels, wherein said first and second air intake channels are substantially arranged in one plane.

12. The air intake channel system of claim 11, wherein said first air intake channel member is adapted to be pivoted about a pivot axis for varying a length of said first air intake channel.

13. The air intake channel system of claim 11, wherein said common pivotable channel member comprises two channel walls having substantially the shape of a segment of a circle.

14. The air intake channel system of claim 11, wherein said first and second air intake channel members are connected via webs.

15. The air intake channel system of claim 14, wherein said webs are connected with a central receiving portion.

16. The air intake channel system of claim 15, wherein said receiving portion is adapted to be connected with a drive shaft.

\* \* \* \* \*